(12) United States Patent
Hirase et al.

(10) Patent No.: US 10,344,860 B2
(45) Date of Patent: Jul. 9, 2019

(54) HIGHLY HEAT CONDUCTIVE PISTON RING FOR INTERNAL COMBUSTION ENGINE

(71) Applicants: NIPPON PISTON RING CO., LTD., Saitama-shi, Saitama (JP); NISSAN MOTOR CO., LTD., Yokohama-shi, Kanagawa (JP)

(72) Inventors: Tsugane Hirase, Ichinoseki (JP); Hiromichi Yokokawa, Utsunomiya (JP); Kazuhiro Fujimura, Kuki (JP); Junpei Ogawa, Tokyo (JP); Takaaki Kondo, Yokohama (JP); Tomonori Miyazawa, Chigasaki (JP); Toyoki Iguchi, Yokohama (JP); Takuma Suzuki, Kawasaki (JP)

(73) Assignees: NIPPON PISTON RING CO., LTD., Saitama-shi, Saitama (JP); NISSAN MOTOR CO., LTD., Yokohama-shi, Kanagawa (JP)

(*) Notice: Subject to any disclaimer, the term of this patent is extended or adjusted under 35 U.S.C. 154(b) by 367 days.

(21) Appl. No.: 14/911,757

(22) PCT Filed: Sep. 8, 2014

(86) PCT No.: PCT/JP2014/073674
§ 371 (c)(1),
(2) Date: Feb. 12, 2016

(87) PCT Pub. No.: WO2015/034086
PCT Pub. Date: Mar. 12, 2015

(65) Prior Publication Data
US 2016/0186860 A1    Jun. 30, 2016

(30) Foreign Application Priority Data
Sep. 9, 2013 (JP) .................. 2013-186358

(51) Int. Cl.
*B32B 15/00* (2006.01)
*F16J 9/26* (2006.01)
(Continued)

(52) U.S. Cl.
CPC .................. *F16J 9/26* (2013.01); *C21D 1/18* (2013.01); *C21D 6/004* (2013.01); *C21D 6/005* (2013.01);
(Continued)

(58) Field of Classification Search
None
See application file for complete search history.

(56) References Cited

U.S. PATENT DOCUMENTS

| 2002/0005616 A1 | 1/2002 | Kubota et al. |
| 2004/0256029 A1 | 12/2004 | Takayama et al. |

(Continued)

FOREIGN PATENT DOCUMENTS

| DE | 69813975 T2 | 2/2004 |
| EP | 1 063 454 B1 | 4/2006 |

(Continued)

OTHER PUBLICATIONS

Written Opinion of the International Searching Authority dated Nov. 11, 2014 for PCT/JP2014/073674.

*Primary Examiner* — Seth Dumbris
(74) *Attorney, Agent, or Firm* — Drinker Biddle & Reath LLP

(57) ABSTRACT

There is provided a highly heat conductive piston ring for an internal combustion engine capable of exhibiting a gas seal function and a heat transfer function for a long period of time in a stable manner when used in an automobile gasoline engine having a high compression ratio. The highly heat conductive piston ring for an internal combustion engine is a piston ring for an internal combustion engine having an (Continued)

Mn—Cr steel as a base material, the Mn—Cr steel including C in the range of from 0.52 to 0.65 mass %, Si in the range of from 0.15 to 0.35 mass %, Mn in the range of from 0.60 to 1.00 mass %, Cr in the range of from 0.60 to 1.00 mass %, P in the range of 0.04 mass % or less, S in the range of 0.04 mass % or less, a slight amount of components (total content of Al, Ni, and Cu) in the range of from 0.05 to 3.0 mass %, and a remnant being Fe and unavoidable impurities.

4 Claims, 3 Drawing Sheets

(51) Int. Cl.

| | | |
|---|---|---|
| *C21D 9/40* | (2006.01) | |
| *C22C 38/00* | (2006.01) | |
| *C22C 38/42* | (2006.01) | |
| *F02F 5/00* | (2006.01) | |
| *C21D 1/18* | (2006.01) | |
| *C21D 6/00* | (2006.01) | |
| *C22C 38/02* | (2006.01) | |
| *C22C 38/04* | (2006.01) | |
| *C22C 38/06* | (2006.01) | |
| *F16J 9/28* | (2006.01) | |

(52) U.S. Cl.
CPC ............... *C21D 6/008* (2013.01); *C21D 9/40* (2013.01); *C22C 38/00* (2013.01); *C22C 38/002* (2013.01); *C22C 38/02* (2013.01); *C22C 38/04* (2013.01); *C22C 38/06* (2013.01); *C22C 38/42* (2013.01); *F02F 5/00* (2013.01); *F16J 9/28* (2013.01); *Y10T 428/12951* (2015.01); *Y10T 428/12958* (2015.01); *Y10T 428/12965* (2015.01)

(56) References Cited

U.S. PATENT DOCUMENTS

| | | |
|---|---|---|
| 2009/0226756 A1 | 9/2009 | Ogawa et al. |
| 2011/0018207 A1 | 1/2011 | Ohishi et al. |
| 2013/0062835 A1 | 3/2013 | Shima et al. |
| 2014/0117626 A1 | 5/2014 | Shima |

FOREIGN PATENT DOCUMENTS

| | | |
|---|---|---|
| EP | 2 101 090 A2 | 9/2009 |
| JP | 2009-235561 A | 10/2009 |
| JP | 2013-007404 A | 1/2013 |
| WO | WO-2009-119388 A1 | 10/2009 |
| WO | WO-2011-148934 A1 | 12/2011 |

HIGHLY HEAT CONDUCTIVE PISTON RING FOR INTERNAL COMBUSTION ENGINE

FIELD OF THE INVENTION

The present invention relates to a piston ring mounted to a piston for an internal combustion engine. In particular, the present invention relates to a highly heat conductive piston ring that can be suitably used for a top ring and a second ring of an automobile gasoline engine having a high compression ratio.

BACKGROUND ART

In recent years, the internal combustion engine of an automobile gasoline engine and the like has improved in fuel efficiency taking environmental issues into consideration. Accordingly, engine specifications have trended toward increased compression so as to make it possible to exhibit a higher thermal efficiency and extract greater kinetic energy. The automobile gasoline engine, having a pressure for pressing down the piston that increases in proportion to the compression ratio, tends to have a high output and a high torque compared to an engine having a low compression ratio under identical volumes of exhaust and input fuel. However, in the automobile gasoline engine, an increase in compression ratio results in an increase in a temperature and a pressure inside a combustion chamber at a top dead center of the piston, causing a mixture of fuel and air to ignite before appropriately formed. As a result, in an automobile gasoline engine having a high compression ratio, combustion occurs locally inside the combustion chamber, making the combustion of fuel near the top dead center of the piston difficult, causing knocking. In this case, the automobile gasoline engine can no longer achieve the desired output or torque, and is more susceptible to nitrogen oxide (Nox) generation as well as soot production.

Further, examples of measures used to appropriately achieve combustion near the top dead center of the piston in the automobile gasoline engine include decreasing the temperature of a combustion chamber wall. Here, to decrease the temperature of this combustion chamber wall, it is effective to decrease the temperature of a piston crown surface that directly receives an explosion pressure in association with a reciprocating motion of the piston. Examples of means for decreasing the temperature of the piston crown surface include means for improving a heat transfer function required in a piston ring mounted to the piston, whereby a combustion heat received by the piston is efficiently transmitted to a cylinder, making it possible to appropriately achieve combustion near the top dead center of the piston. From the above, the piston ring used in the automobile gasoline engine having a high compression ratio particularly requires further improvement in a gas seal function and the heat transfer function.

With such a background, Patent Document 1 (Japanese Laid-Open Patent Application No. 2009-235561) proposes a piston ring that specifies suitable component ranges for carbon (C), silicon (Si), manganese (Mn), and chromium (Cr) under predetermined parameters. Specifically, the piston ring of Patent Document 1 comprises a heat-treated steel including C in a range of from 0.20 to 0.90 mass %, Si in a range of from 0.10 to less than 0.60 mass %, Mn in a range of from 0.20 to 1.50 mass %, Cr in a range of from 0.30 to 2.00 mass %, and a remnant being iron (Fe) and unavoidable impurities, wherein, based on contents of C, Si, Mn, and Cr, values of parameters A and B calculated from a formula "A=8.8 Si+1.6 Mn+1.7 Cr" and a formula "B=36 C+4.2 Si+3.8 Mn+4.5 Cr" are 9.0 or less and 10.8 or more, respectively (refer to claim 1).

PATENT DOCUMENTS

Patent Document 1: Japanese Laid-Open Patent Application No. 2009-235561

SUMMARY OF THE INVENTION

Problems to be Solved by the Invention

However, when the piston ring of Patent Document 1 described above is used in an automobile gasoline engine having a high compression ratio, it is difficult to appropriately achieve combustion near the top dead center of the piston in the automobile gasoline engine. That is, in the automobile gasoline engine having a high compression ratio with the piston ring proposed in Patent Document 1 mounted thereto, the temperature of the piston crown surface cannot sufficiently decrease, making it impossible to exhibit the gas seal function and the heat transfer function for a long period of time in a stable manner.

It is therefore an object of the present invention to provide a highly heat conductive piston ring for an internal combustion engine capable of exhibiting a gas seal function and a heat transfer function for a long period of time in a stable manner when used in an automobile gasoline engine having a high compression ratio. In particular, it is an object of the present invention to provide a highly heat conductive piston ring for an internal combustion engine having an improved function, that is, heat transfer function, of releasing heat input to a piston to a cylinder bore inner surface, decreasing a combustion chamber temperature, and avoiding an occurrence of knocking, and an improved heat fatigue resistance for withstanding use under a higher temperature environment.

Means for Solving the Problems

The present inventors conducted extensive studies and found that they could solve the above problems by utilizing a piston ring that includes C, Si, Mn, Cr, phosphorous (P), and sulfur (S), as well as aluminum (Al), nickel (Ni), and copper (Cu) as a slight amount of components, each in a predetermined amount, as an Mn—Cr steel.

A highly heat conductive piston ring for an internal combustion engine according to the present invention is a piston ring for an internal combustion engine having an Mn—Cr steel as a base material, the Mn—Cr steel including C in the range of from 0.52 to 0.65 mass %, Si in the range of from 0.15 to 0.35 mass %, Mn in the range of from 0.60 to 1.00 mass %, Cr in the range of from 0.60 to 1.00 mass %, P in the range of 0.04 mass % or less, S in the range of 0.04 mass % or less, a slight amount of components (total content of Al, Ni, and Cu) in the range of from 0.05 to 3.0 mass %, and a remnant being Fe and unavoidable impurities.

In the highly heat conductive piston ring for an internal combustion engine according to the present invention, the Mn—Cr steel preferably includes each of the slight amount of components Al, Ni, and Cu in the range of from 0.01 to 1.0 mass %.

In the highly heat conductive piston ring for an internal combustion engine according to the present invention, the contents of the slight amount of components Al, Ni, and Cu included in the Mn—Cr steel preferably satisfy a relationship of the following formula (1).

[Formula 1]

$$1.0 \leq \frac{[\text{Al content (mass \%)}] + [\text{Cu content (mass \%)}]}{[\text{Ni content (mass \%)}]} \leq 20 \quad (1)$$

In the highly heat conductive piston ring for an internal combustion engine according to the present invention, an outer circumferential surface of the piston ring preferably comprises a hard film of any one or two or more types of a hard chrome plating, a hard ceramic, and a hard carbon.

In the highly heat conductive piston ring for an internal combustion engine according to the present invention, top and bottom surfaces and/or an inner circumferential surface of the piston ring are preferably treated using at least one or two or more types of oxidation treatment, chemical conversion treatment, resin coating, and hard carbon film formation.

In the highly heat conductive piston ring for an internal combustion engine according to the present invention, a hardness after quench hardening and tempering is preferably 40 HRC or more, and a thermal conductivity is preferably 40 W/(m·K) or more.

Effect of the Invention

In the highly heat conductive piston ring for an internal combustion engine according to the present invention, Mn—Cr steel serving as the base material includes C, Si, Mn, Cr, P, and S, as well as Al, Ni, and Cu as a slight amount of components, each in a predetermine amount, making it possible to exhibit a gas seal function and a heat transfer function for a long period of time in a stable manner when used in an automobile gasoline engine having a high compression ratio. In particular, the highly heat conductive piston ring for an internal combustion engine is capable of improving a function, that is, a heat transfer function, of releasing heat input to a piston to a cylinder bore inner surface, decreasing a combustion chamber temperature, and avoiding an occurrence of knocking, and improving a heat fatigue resistance for withstanding use under a higher temperature environment.

EMBODIMENTS OF THE INVENTION

The following describes a preferred embodiment of a highly heat conductive piston ring for an internal combustion engine according to the present invention, using drawings.

A highly heat conductive piston ring 1 for an internal combustion engine according to the present invention is a piston ring for an internal combustion engine having an Mn—Cr steel as a base material 2. The Mn—Cr steel includes C in the range of from 0.52 to 0.65 mass %, Si in the range of from 0.15 to 0.35 mass %, Mn in the range of from 0.60 to 1.00 mass %, Cr in the range of from 0.60 to 1.00 mass %, P in the range of 0.04 mass % or less, S in the range of 0.04 mass % or less, a slight amount of components (total content of Al, Ni, and Cu) in the range of from 0.05 to 3.0 mass %, and a remnant being Fe and unavoidable impurities.

Figure 1A:
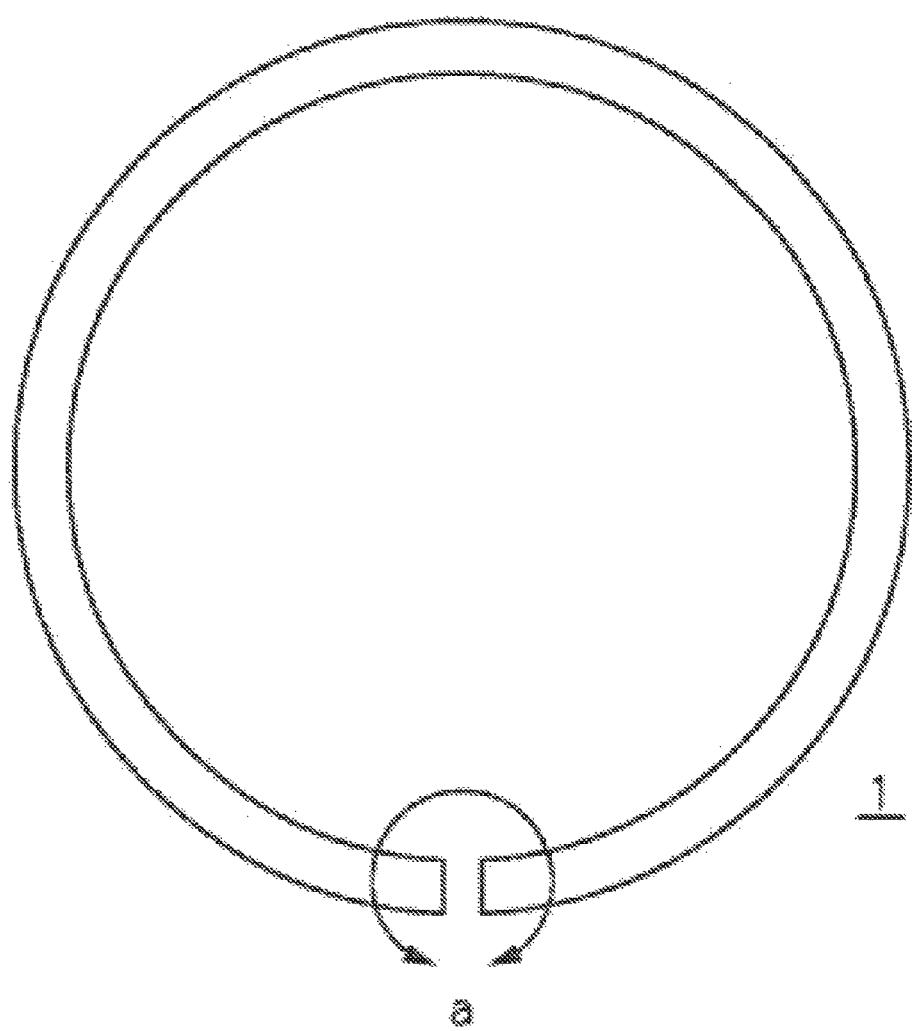
FIG. 1A is a plan view and FIG. 1B is a partial perspective view of a highly heat conductive piston ring for an internal combustion engine of one embodiment of the present invention.
Figure 1B:
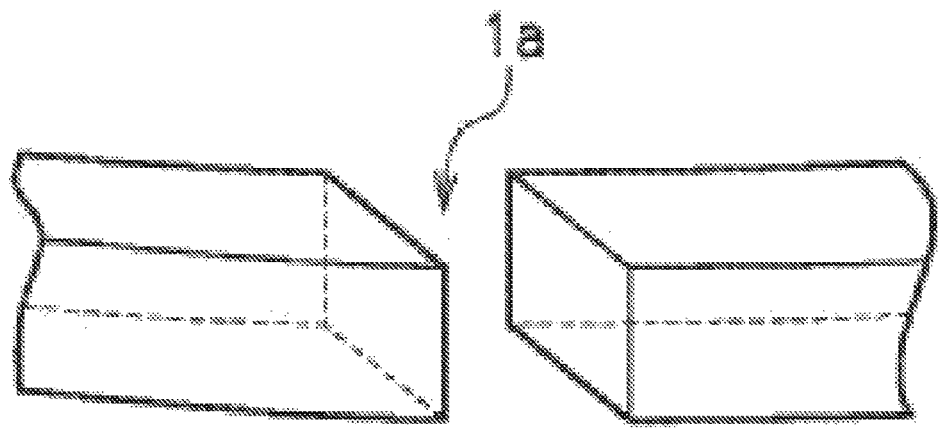
Figure 2:
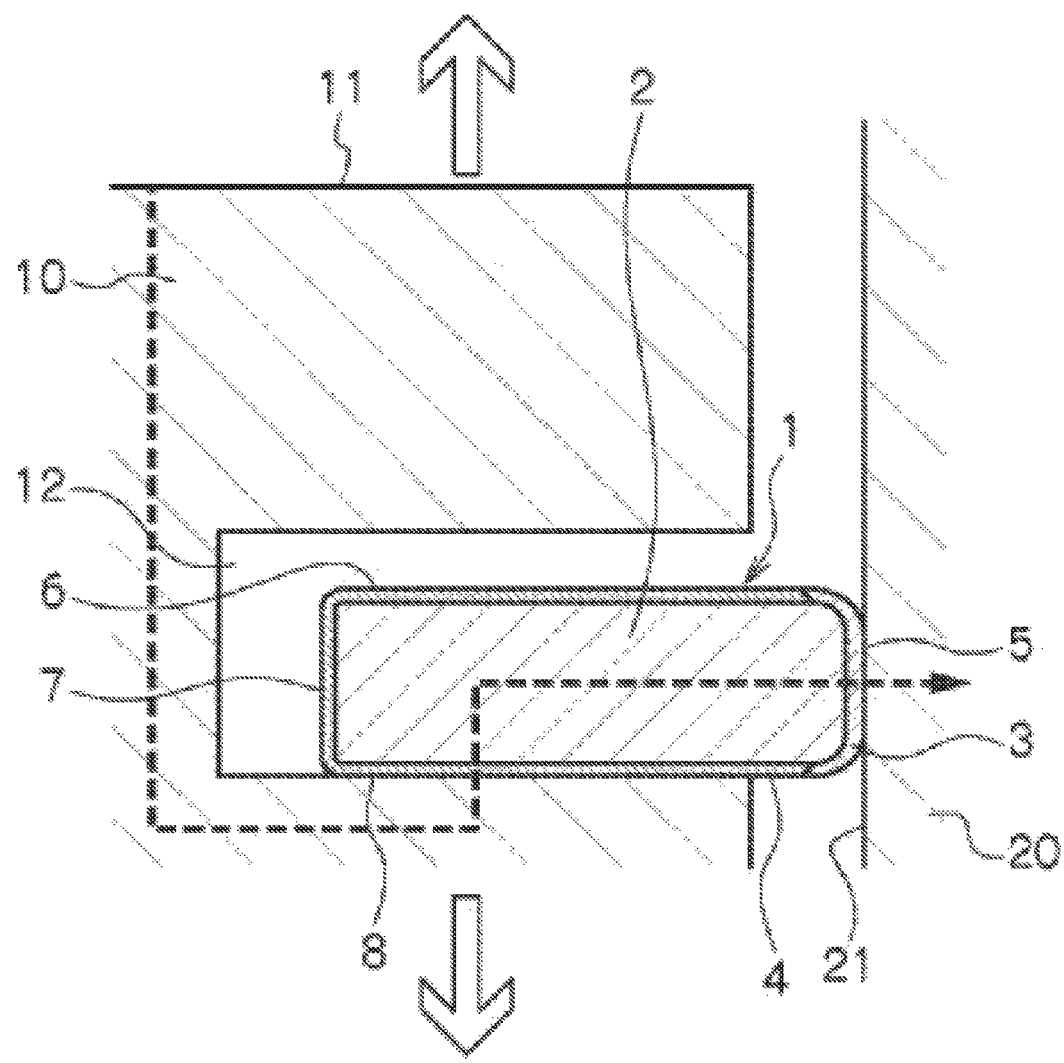
FIG. 2 is an essential part longitudinal cross-sectional view of a piston having the highly heat conductive piston ring for an internal combustion engine mounted thereto of one embodiment of the present invention.

FIGS. 1A and 1B illustrate one example of the piston ring (pressure ring) 1 that assumes a ring shape, forms a gap 1a, and has a substantially rectangular cross-section. The piston ring 1, as illustrated in FIGS. 1A and 1B, is capable of increasing a deflection margin with the formation of the gap 1a and, as illustrated in FIG. 2, bringing an outer circumferential surface 5 thereof into contact with a cylinder inner wall surface 21 in a circumferential direction when a piston 10 is in the midst of a reciprocating motion (in directions of outlined arrows in the figure). The piston ring 1 is mounted to a piston ring groove 12 provided to the piston 10, and fills a slight gap between the cylinder inner wall surface 21 and the piston 10, thereby sealing a combustion gas. Furthermore, the outer circumferential surface 5 of the piston ring pressed by its own tension to the cylinder inner wall surface 21 moderately controls a thickness of an oil film while following the movement of the piston 10. Then, at this time, the piston ring 1 continually contacts the cylinder inner wall surface 21 via the oil film, and is therefore capable of transmitting the heat input to a piston crown surface 11 to a cylinder 20 side (refer to a dotted arrow in FIG. 2).

The highly heat conductive piston ring 1 for an internal combustion engine has the Mn—Cr steel as a base material 2, and the Mn—Cr steel has an alloy composition that includes the above-described alloy elements (C, Si, Mn, Cr, P, S, Al, Ni, and Cu) in the above-described ranges, and therefore serves as an excellent heat transfer member, making it possible to improve a heat transfer function. Thus, according to the highly heat conductive piston ring 1 for an internal combustion engine according to the present invention, it is possible to more effectively transmit the heat input to the piston crown surface 11 to the cylinder 20 side, and suitably facilitate use under a harsh heat environment of an engine having a high compression ratio. Further, the highly heat conductive piston ring 1 for an internal combustion engine according to the present invention has an alloy composition that includes amounts in the above-described ranges, thereby improving wear resistance, scuff resistance, softening resistance, heat fatigue resistance, and fatigue strength, making it possible to exhibit a gas seal function and an oil control function for a long period of time in a stable manner when used in an automobile gasoline engine having a high compression ratio.

The following describes actions of the alloy elements included in the Mn—Cr steel, and reasons for limiting the numeric values of the percentages by mass. The Mn—Cr steel changes to a material having various added values based on naturally endowed properties by the included alloy elements and the percentages by mass thereof.

Carbon (C) as an alloy element dissolves in a base, and is effective in increasing hardness and ensuring softening resistance and heat fatigue resistance after quench hardening and tempering (refinement). In order for the highly heat conductive piston ring for an internal combustion engine to achieve such an effect, the content of C is preferably within a range of from 0.52 to 0.65 mass %. When the content of C is less than 0.52 mass %, improvements in wear resistance performance and mechanical strength are not achieved, and thus such a content is not preferred. On the other hand, when the content of C exceeds 0.65 mass %, decreases in impact resistance performance result and a favorable machining performance can no longer be achieved, and thus such a content is not preferred. The content of C is more preferably within a range of from 0.52 to 0.60 mass %, and even more preferably within a range of from 0.54 to 0.58 mass %.

Silicon (Si) as an alloy element has a deoxidation action and a desulfurization action when steel is smelted, and is effective in improving softening resistance by solid solution strengthening. In order for the highly heat conductive piston ring for an internal combustion engine to achieve such an effect, the content of Si is preferably within a range of from 0.15 to 0.35 mass %. When the content of Si is less than 0.15 mass %, solid solution strengthening is not achieved and wear resistance, scuff resistance, and heat fatigue resistance cannot be improved, and thus such a content is not preferred. On the other hand, when the content of Si exceeds 0.35 mass %, decreases in thermal conductivity and toughness result, and thus such a content is not preferred. The content of Si is more preferably within a range of from 0.17 to 0.25 mass %.

Manganese (Mn) as an alloy element is effective as a deoxidizing agent during steel smelting, and is effective in improving the toughness and tensile strength of steel to ensure strength after quench hardening and tempering (refinement). In order for the highly heat conductive piston ring for an internal combustion engine to achieve such an effect, the content of Mn is preferably within a range of from 0.60 to 1.00 mass %. When the content of Mn is less than 0.60 mass %, the strength after quench hardening and tempering (refinement) cannot be sufficiently ensured, and thus such a content is not preferred. On the other hand, when the content of Mn exceeds 1.00 mass %, the hardness after quench hardening and tempering (refinement) becomes excessive, leading to embrittlement of the base, making durability and favorable machining performance no longer achievable, and thus such a content is not preferred. The content of Mn is more preferably within a range of from 0.75 to 0.85 mass %.

Chromium (Cr) as an alloy element forms a Cr carbide, and is effective in improving heat resistance and corrosion resistance, and simultaneously improving wear resistance. Further, Cr is effective in improving quench hardening properties, increasing tempering resistance, and ensuring strength and toughness after quench hardening and tempering (refinement). In order for the highly heat conductive piston ring for an internal combustion engine to achieve such an effect, the content of Cr is preferably within a range of from 0.60 to 1.00 mass %. When the content of Cr is less than 0.60 mass %, improving heat resistance, corrosion resistance, and wear resistance becomes difficult, and thus such a content is not preferred. When the content of Cr exceeds 1.00 mass %, generation of the Cr carbide becomes excessive, thermal conductivity decreases, and the Cr carbide segregates at grain boundaries and becomes hard and brittle, causing decreases in impact resistance performance and machining performance, and thus such a content is not preferred. Further, Cr is expensive, and leads to increases in product costs when included in large amounts. The content of Cr is more preferably within a range of from 0.75 to 0.90 mass %.

Phosphorous (P) as an alloy element, while normally a harmful element that causes grain boundary brittleness, dissolves in ferrite in steel, and is effective in increasing hardness and tensile strength, and improving machinability. In order for the highly heat conductive piston ring for an internal combustion engine to achieve such an effect, the content of P is preferably 0.04 mass % or less. When the content of P exceeds 0.04 mass %, formation of iron phosphide (Fe3P) is promoted, workability deteriorates, and impact resistance decreases, and thus such a content is not preferred.

Sulfur (S) as an alloy element, while considered to have a low melting point and cause red shortness, can improve workability by adding Mn to produce manganese sulfide (MnS). In order for the highly heat conductive piston ring for an internal combustion engine to achieve such an effect, the content of S is preferably 0.04 mass % or less. When the content of S exceeds 0.04 mass %, deterioration in workability and decreases in impact resistance result, and thus such a content is not preferred.

In the highly heat conductive piston ring for an internal combustion engine, the Mn—Cr steel serving as the base material includes aluminum (Al), nickel (Ni), and copper (Cu) as a slight amount of components. Al as a slight amount of component is effective as a deoxidizing agent during steel smelting, miniaturizes crystal grains to improve workability, and improves thermal conductivity. Ni as a slight amount of component can improve quench hardening properties and improve toughness. Furthermore, Ni as a slight amount of component can impart heat resistance in the base, improve wear resistance performance, and improve corrosion resistance and heat resistance by adding Cr as well. Cu as a slight amount of component can improve atmospheric corrosion resistance, and further improve this effect by adding Ni as well. Furthermore, Cu as a slight amount of component can improve the thermal conductivity of the Mn—Cr steel and impart a solid lubricating action.

The highly heat conductive piston ring for an internal combustion engine, by combining Al, Ni, and Cu as a slight amount of components with the alloy elements described above, is capable of exhibiting unprecedented excellent effects in relation to the gas seal function and the heat transfer function for a long period of time, even when used under a harsh heat environment of an engine having a high compression ratio. In order for the highly heat conductive piston ring for an internal combustion engine to achieve such an effect, the total content of Al, Ni, and Cu is preferably within a range of from 0.05 to 3.0 mass %. When the alloy content of Al, Ni, and Cu is less than 0.05 mass %, it becomes difficult to achieve synergy effects resulting from combining these with the alloy elements described above. Further, when the alloy content of Al, Ni, and Cu exceeds 3.0 mass %, precipitation of intermetallic compounds increases and thermal conductivity decreases, and thus such a content is not preferred.

From the above, the highly heat conductive piston ring 1 for an internal combustion engine according to the present invention makes it possible for the elements included in the Mn—Cr steel to exhibit effects independently and for specific elements to achieve synergy effects in combination. As a result, the piston ring 1 is capable of exhibiting unprecedented excellent effects in relation to heat transference without loss in durability, and can be suitably used in an automobile gasoline engine having a high compression ratio.

The Mn—Cr steel preferably includes each of the slight amount of components Al, Ni, and Cu in the range of from 0.01 to 1.0 mass %.

In the highly heat conductive piston ring 1 for an internal combustion engine, the contents of Al, Ni, and Cu are each within the range of from 0.01 to 1.0 mass %, making it possible to achieve synergy effects in combination with the alloy elements described above, improve the heat transfer function, and maintain the gas seal function and the oil control function for a long period of time. When the content of any one of Al, Ni, and Cu is less than 0.01 mass %, the synergy effects resulting from combining these elements cannot be sufficiently achieved. On the other hand, when the content of Al or Cu exceeds 1.0 mass %, the precipitation of intermetallic compounds increases and thermal conductivity decreases, and thus such a content is not preferred. Further, when the content of Ni exceeds 1.0 mass %, a rise in product cost results, and thus such a content is not preferred.

The contents of the slight amount of components Al, Ni, and Cu included in the Mn—Cr steel preferably satisfy the relationship of the following formula (1):

[Formula 2]

$$1.0 \leq \frac{[\text{Al content (mass \%)}] + [\text{Cu content (mass \%)}]}{[\text{Ni content (mass \%)}]} \leq 20 \quad (1)$$

Al and Cu, while mainly effective in improving the heat transfer function of the piston ring 1, decrease the durability of the piston ring when the content is increased excessively. On the other hand, Ni contributes to improving the hardness of the piston ring 1, and is mainly effective in improving durability and heat fatigue resistance. As a result, with each of the contents of Al, Ni, and Cu satisfying the relationship expressed in formula (1), it is possible to improve heat transference while preventing a decrease in wear resistance, scuff resistance, heat fatigue resistance, and fatigue strength of the piston ring 1, and use the piston ring 1 for a long period of time in a stable manner even under an environment of a high thermal load of an engine having a high compression ratio. At this time, the ratio of the content of Ni to the contents of Al and Cu is preferably within the range of from 1.0 to 20. When the ratio of the content of Ni to the contents of Al and Cu is less than 1.0, it is difficult to sufficiently exhibit the heat transfer function required as a piston ring under a harsh heat environment. On the other hand, when the ratio of the content of Ni to the contents of Al and Cu exceeds 20, the durability and heat fatigue resistance of the piston ring cannot be sufficiently improved, making it difficult to exhibit the gas seal function and the oil control function required as a piston ring under a harsh heat environment for a long period of time in a stable manner.

In the highly heat conductive piston ring 1 for an internal combustion engine, the outer circumferential surface 5 of the piston ring preferably comprises a hard film 3 of any one or two or more types of a hard chrome plating, a hard ceramic, and a hard carbon.

With the outer circumferential surface 5 of the piston ring 1 comprising the hard film 3 of any one or two or more types of the hard chrome plating, the hard ceramic, and the hard carbon, wear caused by sliding along the cylinder inner wall surface 21 with continuous contact is effectively suppressed, making it possible to favorably maintain a contact state with the cylinder inner wall surface 21 over a long period of time. Accordingly, with the outer circumferential surface 5 of the piston ring 1 comprising the hard film 3 described above, it is possible to exhibit action that transmits a heat of the piston 10 to the cylinder 20 side for a long period of time, as well as the gas seal function and the oil control function required as a piston ring under a harsh heat environment for a long period of time in a stable manner. It should be noted that, even if the outer circumferential surface 5 of the piston ring 1 comprises the hard film 3, there is no effect on thermal conductivity. Further, the hard film 3 may be obtained by layering a plurality of types of hard films as long as the thermal conductivity of the piston ring 1 is not affected.

In the highly heat conductive piston ring 1 for an internal combustion engine, top and bottom surfaces 6, 8 and/or an inner circumferential surface 7 of the piston ring are preferably treated using at least one or two or more types of oxidation treatment, chemical conversion treatment, resin coating, and hard carbon film formation.

With the top and bottom surfaces 6, 8 and/or inner circumferential surface 7 of the piston ring treated using at least one or two or more types of oxidation treatment, chemical conversion treatment, resin coating, and hard carbon film formation, it is possible to effectively suppress wear caused by adhesion or the like inside the piston ring groove 12. Accordingly, the surface treatment described above is performed on the top and bottom surfaces 6, 8 and/or the inner circumferential surface 7 of the piston ring 1, making it possible to follow the reciprocating motion of the piston for a long period of time in a stable manner, and exhibit the gas seal function and the heat transfer function required as a piston ring under a harsh heat environment for a long period of time in a stable manner. It should be noted that, even if the top and bottom surfaces 6, 8 and/or the inner circumferential surface 7 of the piston ring 1 are treated and thus constitute a surface treated layer 4, there is no effect on thermal conductivity. Further, the surface treated layer 4 may be obtained by performing a plurality of different types of surface treatments as long as the thermal conductivity of the piston ring 1 is not affected.

In the highly heat conductive piston ring 1 for an internal combustion engine, the hardness after quench hardening and tempering is preferably 40 HRC or more, and a thermal conductivity is preferably 40 W/(m·K) or more.

In the highly heat conductive piston ring 1 for an internal combustion engine, the Mn—Cr steel is manufactured by quench hardening within a range of from 830 to 900° C., followed by tempering within a range of from 400 to 500° C., making it possible to achieve desired characteristics in relation to wear resistance, scuff resistance, heat fatigue resistance, and fatigue strength. Then, the highly heat conductive piston ring 1 for an internal combustion engine has a hardness after quench hardening and tempering (refinement) of 40 HRC or more, making it possible to ensure the strength of the piston ring and exhibit the gas seal function required as a piston ring for a long period of time in a stable manner when used in an automobile gasoline engine having a high compression ratio. Further, the highly heat conductive piston ring 1 for an internal combustion engine, by maintaining a thermal conductivity of 40 W/(m·K) or more, can effectively transmit the heat of the piston 10 to the cylinder 20. For reference, the highly heat conductive piston ring 1 for an internal combustion engine, when used as a top ring placed under a harsh heat environment closest to the combustion chamber, can achieve a greater fuel efficiency improvement effect than when a piston ring made of martensitic stainless steel (SUS440C) or silicon-chromium steel (SWOSC-V) utilized as a conventional top ring is used.

EXAMPLES

The following indicates examples, and describes the present invention in more detail. The present invention, however, is not limited to these examples.

Example 1

As an example of the highly heat conductive piston ring for an internal combustion engine according to the present invention, samples A to Z and AA to AD that satisfy the conditions of the alloy composition specified in the present invention were fabricated. In the fabrication of the samples A to Z and AA to AD, each of the Mn—Cr steels having the alloy compositions shown in Table 1 was first subjected to cold working, wire drawing and subsequently quenched and tempered (refining) at a quench hardening temperature of 900° C. and a tempering temperature of 450° C., and a material having a 1.2 mm×2.5 mm rectangular cross-section was obtained. Next, this wire material was formed into a ring so as to match a bore diameter of 78 mm, and a section to serve as a gap was cut. Each of the piston rings of the samples A to Z and AA to AD thus fabricated was then straightened by heat treatment, subjected to outer periphery machining, and formed into any one of a total of three types including a type having the outer circumferential surface covered with only a Cr—N based physical vapor deposition (PVD) film as a hard ceramic film, a type having the outer circumferential surface covered with only a diamond-like carbon (DLC) film including hydrogen in an amount of 2 atomic % as a hard carbon film, and a type having the outer circumferential surface covered with a film made of two layers obtained by layering the DLC film on the PVD film. Subsequently, each of the piston rings of the samples A to Z and AA to AD was subjected to finishing work, and a tri-iron tetroxide film was formed on the top and bottom surfaces of the piston ring. It should be noted that the top and bottom surfaces and the outer circumferential surface of the piston ring prior to the various surface treatments were polished so that a ten-point average roughness Rz thereof was within a range of from 1.3 to 2.2 μm. The ten-point average roughness Rz conforms to JIS B0601 (1982), and was measured using a surface roughness and contour measuring device.

The fabricated samples A to Z and AA to AD were measured for a Rockwell hardness (C scale) after tempering at 400° C., and for thermal conductivity by a laser flash method. Furthermore, a fatigue strength test and a heat fatigue resistance test were conducted using these samples A to Z and AA to AD, based on the procedures below. These measurements and tests were performed in order to confirm that the piston ring exhibited the gas seal function and the heat transfer function for a long period of time in a stable manner when used in an automobile gasoline engine having a high compression ratio. Table 1 summarizes the alloy compositions of the samples A to Z and AA to AD, and shows the results from the measurement of the Rockwell hardness (C scale) after tempering at 400° C., the measurement of thermal conductivity by the laser flash method, the fatigue strength test, and the heat fatigue resistance test performed on the samples A to Z and AA to AD. It should be noted that the Rockwell hardness (C scale) was measured using a Rockwell hardness tester. Further, the thermal conductivity by the laser flash method was measured using a laser flash method thermophysical property measuring device.

(Fatigue Strength Test)

Figure 3:
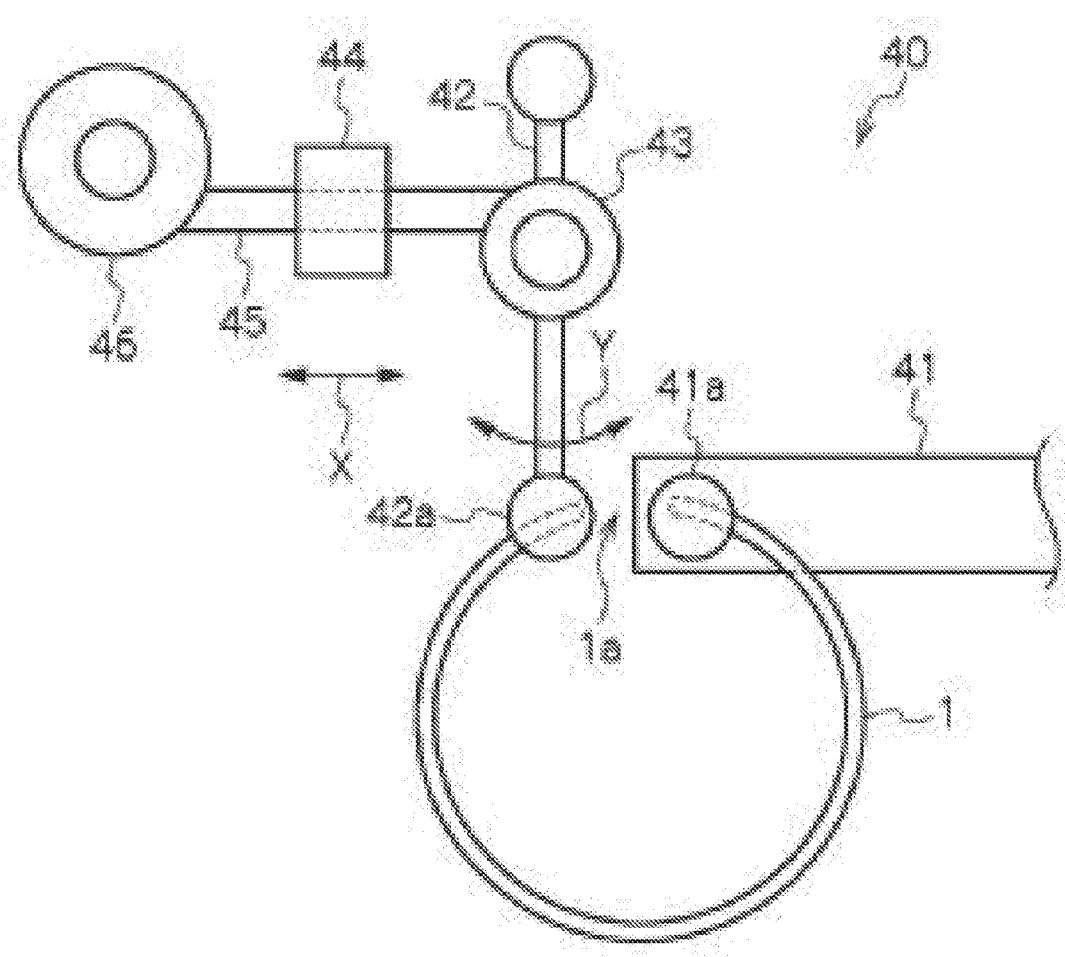
FIG. 3 is a schematic view illustrating an overview of a fatigue strength test for evaluating a fatigue strength of the piston ring.

FIG. 3 is a schematic view illustrating an overview of the fatigue strength test for evaluating the fatigue strength of the piston ring. The following describes the fatigue strength test using FIG. 3. In the fatigue strength test, using a fatigue strength tester 40 schematically shown in FIG. 3, first one end of the gap 1a of the piston ring 1 was fixed to a support 41 by a fixing part 41a, and the other end was fixed to one end of a lever arm 42 by a fixing part 42a. Here, one end of a power transmission bar 45 was connected to the other end side of the lever arm 42 by a connecting part 43. The other end side of the power transmission bar 45 was connected to an eccentric cam 46, and the power transmission bar 45 reciprocated in a power transmission axial direction (a direction shown by arrow X in the figure) by rotation of the eccentric cam 46. Then, in association with the movement of the power transmission bar 45 at this time, one end side (the side on which the fixing part 42a is fixed) of the lever arm 42 reciprocated in a rotation direction (a direction shown by arrow Y in the figure) about the connecting part 43, and a bending stress was loaded onto the piston ring 1 when the gap 1a of the piston ring 1 expanded. It should be noted that the power transmission bar 45 prevented shaft runout of a power transmission shaft by a guide 44, making smooth reciprocating motion possible.

In the fatigue strength test, the fatigue strength tester 40 repeatedly expanded the gap 1a of the piston ring 1 by a predetermined amplitude and loaded stress onto the piston ring 1 as described above, and the number of times expansion was repeated until the piston ring 1 broke was measured. Further, in the fatigue strength test, a plurality of the piston rings 1 fabricated under the same conditions was prepared and subjected to testing by changing the setting of the stress loaded onto the piston ring 1, and an S-N curve was created. The load stress of each of the piston rings 1 at this time was set by changing the opening/closing amount of the gap 1a. Then, in the fatigue strength test, the stress withstood at an expansion repetition count of 1×107 times was found from the created S-N curve as the fatigue strength.

(Heat Fatigue Resistance Test)

In the heat fatigue resistance test, each of the piston rings of the samples A to Z and AA to AD was mounted inside a sleeve having a bore diameter of 78 mm, and measured for a rate of tension decline after being held for three hours at a temperature of 300° C., based on JIS B 8032-5 (1998). This tension decline rate was calculated based on a tension reduction rate found by mounting each of the piston rings of the samples A to Z and AA to AD inside the sleeve, and measuring the piston ring tensions before and after heating. For reference, according to the JIS standard (JIS B 8032-5 (1998)), the tension decline rate of a top ring utilized under the harshest high temperature environment among piston rings is defined as 8% or less.

Comparative Example 1

This comparative example is for comparison with the example. As a comparative example of the highly heat conductive piston ring for an internal combustion engine according to the present invention, comparative example samples a to n that do not satisfy the conditions related to Al, Ni, and Cu of the alloy composition specified in the present invention were fabricated. Here, the comparative example samples a to n were fabricated under the same conditions as those of the samples A to Z and AA to AD. Then, in the same manner as the samples A to Z and AA to AD, the fabricated comparative example samples a to n were measured for Rockwell hardness (C scale) after tempering at 400° C., and for thermal conductivity by the laser flash method. Furthermore, using these comparative example samples a to n, a fatigue strength test and a heat fatigue resistance test were conducted based on the same procedures as in the example. Table 2 shows the alloy compositions of the comparative example samples a to n to facilitate comparison with the alloy compositions of the samples. Further, Table 2 summarizes the alloy compositions of the comparative example samples a to n, and shows the results from the measurement of the Rockwell hardness (C scale) after tempering at 400° C., the measurement of thermal conductivity by the laser flash method, the fatigue strength test, and the heat fatigue resistance test performed on the comparative example samples a to n.

Comparison of Example and Comparative Example

The following describes the present invention in detail while comparing the example and the comparative example based on the results shown in Table 1 and Table 2.

TABLE 1

| | C | Si | Mn | Cr | P | S | Al | Ni | Cu | Al + Ni + Cu | (Al + Cu)/Ni | Hardness (HRC) | Thermal conductivity | Fatigue Strength | Tension Decline Rate (%) | Surface Treatment Specifications |
|---|---|---|---|---|---|---|---|---|---|---|---|---|---|---|---|---|
| Example A | 0.52 | 0.15 | 0.60 | 0.60 | 0.03 | 0.03 | 0.03 | 0.03 | 0.02 | 0.08 | 1.7 | 48.1 | 41.1 | 101 | 5.6 | PVD |
| Example B | | | | | | | 0.02 | 0.02 | 0.01 | 0.05 | 11.5 | 47.8 | 41.0 | 100 | 5.42 | PVD |
| Example C | | | | | | | 0.03 | 0.02 | 0.01 | 0.06 | 2.0 | 47.8 | 41.1 | 100 | 5.55 | PVD + DLC |
| Example D | | | | | | | 0.05 | 0.03 | 0.02 | 0.10 | 2.3 | 47.9 | 41.2 | 101 | 5.53 | PVD + DLC |
| Example E | | | | | | | 0.03 | 0.04 | 0.03 | 0.10 | 1.5 | 47.9 | 41.2 | 102 | 5.32 | DLC |
| Example F | | | | | | | 0.07 | 0.04 | 0.04 | 0.15 | 2.8 | 48.2 | 41.3 | 101 | 5.28 | DLC |
| Example G | | | | | | | 0.14 | 0.02 | 0.12 | 0.28 | 13.0 | 47.2 | 43.1 | 100 | 5.66 | PVD |
| Example H | | | | | | | 0.50 | 0.35 | 0.30 | 1.15 | 2.3 | 48.1 | 41.2 | 103 | 5.22 | PVD |
| Example I | | | | | | | 1.00 | 1.00 | 0.20 | 2.20 | 1.2 | 49.5 | 40.3 | 100 | 4.88 | PVD |
| Example J | | | | | | | 0.20 | 1.00 | 1.00 | 2.20 | 1.2 | 49.0 | 40.4 | 102 | 4.9 | PVD |
| Example K | | | | | | | 1.00 | 0.20 | 1.00 | 2.20 | 10.0 | 48.0 | 45.3 | 102 | 5.95 | PVD |
| Example L | | | | | | | 0.80 | 0.80 | 0.80 | 2.40 | 2.0 | 48.9 | 41.0 | 103 | 4.5 | PVD |
| Example M | | | | | | | 0.02 | 0.01 | 0.02 | 0.05 | 4.0 | 47.5 | 41.3 | 100 | 5.73 | PVD |
| Example N | | | | | | | 0.03 | 0.01 | 0.02 | 0.06 | 5.0 | 47.2 | 41.2 | 100 | 5.53 | PVD |
| Example O | | | | | | | 0.01 | 0.02 | 0.03 | 0.06 | 2.0 | 48.2 | 40.8 | 101 | 5.75 | PVD |
| Example P | | | | | | | 0.01 | 0.02 | 0.02 | 0.05 | 1.5 | 48.0 | 40.8 | 101 | 5.55 | PVD |
| Example Q | | | | | | | 0.09 | 0.01 | 0.10 | 0.20 | 19.0 | 47.1 | 42.6 | 101 | 5.56 | PVD |
| Example R | 0.60 | 0.35 | 0.80 | 0.95 | 0.03 | 0.02 | 0.03 | 0.03 | 0.02 | 0.08 | 1.7 | 48.8 | 40.4 | 101 | 5.4 | PVD |
| Example S | | | | | | | 0.02 | 0.02 | 0.01 | 0.05 | 1.5 | 48.6 | 40.3 | 101 | 5.22 | PVD |
| Example T | | | | | | | 0.03 | 0.02 | 0.01 | 0.06 | 2.0 | 48.6 | 40.3 | 101 | 5.33 | PVD + DLC |
| Example U | | | | | | | 0.05 | 0.03 | 0.02 | 0.10 | 2.3 | 48.8 | 40.6 | 101 | 5.26 | PVD + DLC |
| Example V | | | | | | | 0.03 | 0.04 | 0.03 | 0.10 | 1.5 | 49.0 | 40.4 | 102 | 5.11 | DLC |
| Example W | | | | | | | 0.07 | 0.04 | 0.04 | 0.15 | 2.8 | 48.8 | 40.7 | 102 | 5.07 | DLC |
| Example X | | | | | | | 0.11 | 0.02 | 0.15 | 0.28 | 13.0 | 48.2 | 42.7 | 100 | 5.43 | PVD |
| Example Y | | | | | | | 0.44 | 0.50 | 0.35 | 1.29 | 1.6 | 48.9 | 40.9 | 104 | 5.05 | PVD |
| Example Z | | | | | | | 0.02 | 0.01 | 0.02 | 0.05 | 4.0 | 48.3 | 40.6 | 100 | 5.55 | DLC |
| Example AA | | | | | | | 0.03 | 0.01 | 0.02 | 0.06 | 5.0 | 48.2 | 40.5 | 101 | 5.36 | DLC |
| Example AB | | | | | | | 0.01 | 0.02 | 0.02 | 0.05 | 1.5 | 49.0 | 40.2 | 102 | 5.56 | PVD |
| Example AC | | | | | | | 0.01 | 0.03 | 0.03 | 0.07 | 1.3 | 48.8 | 40.1 | 102 | 5.35 | PVD |
| Example AD | | | | | | | 0.11 | 0.01 | 0.08 | 0.20 | 19.0 | 48.3 | 42.5 | 100 | 5.45 | PVD |

TABLE 2

| | C | Si | Mn | Cr | P | S | Al | Ni | Cu | Al + Ni + Cu | (Al + Cu)/Ni | Hardness (HRC) | Thermal conductivity | Fatigue Strength | Tension Decline Rate (%) | Surface Treatment Specifications |
|---|---|---|---|---|---|---|---|---|---|---|---|---|---|---|---|---|
| Comparative Example a | 0.52 | 0.15 | 0.60 | 0.60 | 0.03 | 0.03 | — | — | — | — | — | 47.8 | 40.0 | 100 | 5.62 | PVD |
| Comparative Example b | | | | | | | 1.10 | 1.20 | 1.10 | 3.40 | 1.83 | 50.1 | 31.4 | 108 | 3.26 | PVD |
| Comparative Example c | | | | | | | 3.15 | — | — | 3.15 | — | 45.0 | 42.0 | 99 | 6.46 | PVD |
| Comparative Example d | | | | | | | — | 3.15 | — | 3.15 | 0.00 | 48.0 | 37.0 | 102 | 4.75 | PVD |
| Comparative Example e | | | | | | | — | — | 3.15 | 3.15 | — | 44.0 | 42.5 | 99 | 6.67 | PVD |
| Comparative Example f | | | | | | | 1.60 | 1.60 | — | 3.20 | 1.00 | 52.1 | 27.3 | 109 | 3.11 | PVD |
| Comparative Example g | | | | | | | — | 1.60 | 1.60 | 3.20 | 1.00 | 50.2 | 38.8 | 101 | 5.12 | PVD |
| Comparative Example h | | | | | | | 1.60 | — | 1.60 | 3.20 | — | 51.5 | 28.6 | 107 | 3.76 | PVD |
| Comparative Example i | | | | | | | 0.11 | 0.01 | 0.13 | 0.25 | 24.00 | 49.0 | 44.1 | 101 | 5.79 | PVD |
| Comparative Example j | 0.60 | 0.35 | 0.80 | 0.95 | 0.03 | 0.02 | — | — | — | — | — | 48.6 | 38.8 | 101 | 5.20 | PVD |
| Comparative Example k | | | | | | | 1.10 | 1.20 | 1.10 | 3.40 | 1.83 | 50.9 | 29.9 | 109 | 3.01 | PVD |

TABLE 2-continued

|  | C | Si | Mn | Cr | P | S | Al | Ni | Cu | Al + Ni + Cu | (Al + Cu)/ Ni | Hardness (HRC) | Thermal conductivity | Fatigue Strength | Tension Decline Rate (%) | Surface Treatment Specifications |
|---|---|---|---|---|---|---|---|---|---|---|---|---|---|---|---|---|
| Comparative Example l |  |  |  |  |  |  | 3.15 | — | — | 3.15 | — | 46.1 | 39.4 | 100 | 5.97 | PVD |
| Comparative Example m |  |  |  |  |  |  | — | 3.15 | — | 3.15 | 0.00 | 48.7 | 36.1 | 103 | 4.55 | PVD |
| Comparative Example n |  |  |  |  |  |  | — | — | 3.15 | 3.15 |  | 44.9 | 39.8 | 100 | 6.21 | PVD |

(Hardness Measurement Evaluation)

Based on the results shown in Table 1 and Table 2, the average of the hardnesses of the samples A to Z and AA to AD that satisfy the conditions of the alloy composition specified in the present invention was approximately 48.3 (HRC). On the other hand, the average of the hardnesses of the comparative example samples a to n that do not satisfy the conditions of the alloy composition specified in the present invention was approximately 48.4 (HRC). Then, all of the samples A to Z and AA to AD and the comparative example samples a to n were confirmed to maintain a hardness of 40 HRC or more, and to be capable of exhibiting the gas seal function and the oil control function required as a piston ring for a long period of time in a stable manner when used in an automobile gasoline engine having a high compression ratio. Viewing these results alone, the samples and the comparative example samples may be regarded as having no significant recognizable difference in hardness. However, in contrast to a minimum value of the hardness among the samples A to Z and AA to AD being 47.2 (HRC), there exists a number of samples among the comparative example samples a to n that have a hardness less than 47.2 (comparative example samples c, e, i, n, and m). For reference, the hardness of the comparative example sample e was 44.0 (HRC), which was as much as 3.2 (HRC) less than the minimum value of the hardness among the samples A to Z and AA to AD. These results show that using a piston ring that satisfies the conditions of the alloy composition specified in the present invention makes it possible to achieve a more stable hardness than when a conventional piston ring that does not satisfy the conditions is used.

(Evaluation of Thermal Conductivity Measurement)

Based on the results shown in Table 1 and Table 2, the average of the thermal conductivities of the samples A to Z and AA to AD that satisfy the conditions of the alloy composition specified in the present invention was approximately 41.2 (W/(m·K)). Further, all of the samples A to Z and AA to AD were confirmed to maintain a thermal conductivity of 40 W/(m·K) or more, and to be capable of effectively transmitting the heat of the piston to the cylinder. On the other hand, the average of the thermal conductivities of the comparative example samples a to n that do not satisfy the conditions of the alloy composition specified in the present invention was approximately 36.8 (W/(m·K)). Then, the samples b, d, f to h, and j to n among the comparative example samples a to n were confirmed to have a thermal conductivity of 40 W/(m·K) or less, and to not have achieved sufficient improvement in relation to thermal conductivity. These results show that using a piston ring that satisfies the conditions of the alloy composition specified in the present invention makes it possible to achieve improvements in thermal conductivity compared to when a conventional piston ring is used. It should be noted that, while the decrease in thermal conductivity was remarkable in comparative example samples b, f, h, and k, this decrease was conceivably caused by the alloy content of Al, Ni, and Cu being well over 3.0 mass %, resulting in an increase in precipitation of the intermetallic compounds.

(Evaluation of Fatigue Strength Test)

Table 1 and Table 2 show the fatigue strengths of samples A to Z and AA to AD, with the comparative example sample a indexed as 100 (a higher index indicating a better fatigue strength). In this case, based on the results shown in Table 1 and Table 2, the average of the fatigue strengths of the samples A to Z and AA to AD that satisfy the conditions of the alloy composition specified in the present invention was 101. On the other hand, the average of the fatigue strengths of the comparative example samples a to n that do not satisfy the conditions of the alloy composition specified in the present invention was 103. Viewing these results alone, the samples may be regarded as inferior in fatigue strength to the comparative example samples. However, in contrast to all of the fatigue strengths of the samples A to Z and AA to AD being 100 or more, there exists a number of samples among the comparative example samples a to n that have a fatigue strength of less than 100 (comparative example samples c and e). These results show that using a piston ring that satisfies the conditions of the alloy composition specified in the present invention makes it possible to achieve a more stable fatigue strength than when a conventional piston ring that does not satisfy the conditions is used.

(Evaluation of Heat Fatigue Resistance Test)

Based on the results shown in Table 1 and Table 2, the average of the tension decline rates of the samples A to Z and AA to AD that satisfy the conditions of the alloy composition specified in the present invention was 5.40%. On the other hand, the average of the tension decline rates of the comparative example samples a to n that do not satisfy the conditions of the alloy composition specified in the present invention was 5.00%. Viewing these results alone, the samples may be regarded as inferior in heat fatigue resistance to the comparative example samples. However, in contrast to a maximum value of the tension decline rate among the samples A to Z and AA to AD being 5.95% (sample K), there exists a number of samples among the comparative example samples a to n that have a tension decline rate that exceeds 5.95% (comparative example samples c, e, k, and m). For reference, the maximum value of the tension decline rate of the comparative example sample e was 6.67%, which was as much as 0.72% greater than the maximum value of the tension decline rate among the samples A to Z and AA to AD. These results show that using a piston ring that satisfies the conditions of the alloy composition specified in the present invention makes it possible to achieve a more stable heat fatigue resistance than when a conventional piston ring that does not satisfy the conditions is used. Thus, while all of the samples A to Z and AA to AD and the comparative example samples a to n satisfy a standard of a top ring tension decline rate of 8% or less defined in the JIS standard (JIS B 8032-5 (1998)), it was confirmed that the samples A to Z and AA to AD can be used under a harsher heat environment than the comparative example samples a to n.

Summary of Comparison of Example and Comparative Example

The results shown in Table 1 and Table 2 reveal that, by satisfying the conditions specified in the present invention in relation to each of the contents of Al, Ni, and Cu, it is possible to improve hardness, fatigue strength, and heat fatigue resistance and suppress a decrease in thermal conductivity in association with an increase in the contents of C, Si, Mn, and Cr, resulting in a total balance of these characteristics that is superior in stability, making use for a long period of time in a stable manner possible even under an environment of the high thermal load of an engine having a high compression ratio. Thus, according to the highly heat conductive piston ring for an internal combustion engine according to the present invention, by including the alloy elements of the Mn—Cr steel in the amounts of the ranges specified in the present invention, it is possible to improve the heat transfer function of the oil ring as well as exhibit the gas seal function and the oil control function for a long period of time. Further, as shown in Table 1 and Table 2, the highly heat conductive piston ring for an internal combustion engine according to the present invention never adversely affects the characteristics described above as long as the outer circumferential surface comprises at least one type of hard film specified in the present invention.

INDUSTRIAL APPLICABILITY

The highly heat conductive piston ring for an internal combustion engine according to the present invention is capable of exhibiting functions required as an oil ring for a long period of time in a stable manner, even when used in an automobile gasoline engine having a high compression ratio, making it possible to decrease an oil consumption and lengthen a service life of the internal combustion engine. Thus, the highly heat conductive piston ring for an internal combustion engine according to the present invention is preferred from the viewpoints of facilitating efficient oil consumption, realizing effective utilization of resources, and decreasing the load on the environment.

DESCRIPTIONS OF REFERENCE NUMERALS

1 Piston ring
1a Gap
2 Base material
3 Hard film
4 Surface treated layer
5 Outer circumferential surface
6 Top surface
7 Inner circumferential surface
8 Bottom surface
10 Piston
11 Piston crown surface
12 Piston ring groove
20 Cylinder
21 Cylinder inner wall surface
a Gap section
40 Fatigue strength tester
41 Support
41a Fixing part
42 Lever arm
42a Fixing part
43 Connecting part
44 Guide
45 Power transmission bar
46 Eccentric cam

What is claimed is:

1. A heat conductive piston ring for an internal combustion engine, comprising an Mn—Cr steel as a base material; the Mn—Cr steel consisting of C in the range of from 0.52 mass % to 0.65 mass %, Si in the range of from 0.15 mass % to 0.35 mass %, Mn in the range of from 0.60 mass % to 1.00 mass %, Cr in the range of from 0.60 mass % to 1.00 mass %, P in the range of 0.04 mass % or less, S in the range of 0.04 mass % or less, a total content of Al, Ni, and Cu in the range of from 0.05 mass % to 3.0 mass %, and a remnant being Fe and unavoidable impurities,
wherein the Mn—Cr steel includes each of components Ai, Ni, and Cu in the range of from 0.01 mass % to 1.0 mass %, and wherein
a content of components Al, Ni, and Cu included in the Mn—Cr steel satisfies a relationship of formula (1) below

[Formula 1]

$$1.0 \leq \frac{[\text{Al content (mass \%)}] + [\text{Cu content (mass \%)}]}{[\text{Ni content (mass \%)}]} \leq 20. \quad (1)$$

2. The heat conductive piston ring for an internal combustion engine according to claim 1, wherein
an outer circumferential surface of the piston ring comprises a hard film of any one or two or more types of a hard chrome plating, a hard ceramic, and a hard carbon.

3. The heat conductive piston ring for an internal combustion engine according to claim 1, wherein
top and bottom surfaces and/or an inner circumferential surface of the piston ring is treated using at least one or two or more types of oxidation treatment, chemical conversion treatment, resin coating, and hard carbon film formation.

4. The heat conductive piston ring for an internal combustion engine according to claim 1, wherein
a hardness after quench hardening and tempering is 40 HRC or more, and a thermal conductivity is 40 W/(m·K) or more.

* * * * *